United States Patent
Inoue

(10) Patent No.: US 8,142,257 B2
(45) Date of Patent: Mar. 27, 2012

(54) DETECTING DEVICE FOR ABNORMAL WORKPIECE ROTATION IN NON-CIRCULAR WORKPIECE GRINDING MACHINE

(75) Inventor: Masaharu Inoue, Obu (JP)

(73) Assignee: JTEKT Corporation, Osaka-shi (JP)

( * ) Notice: Subject to any disclaimer, the term of this patent is extended or adjusted under 35 U.S.C. 154(b) by 582 days.

(21) Appl. No.: 12/367,755

(22) Filed: Feb. 9, 2009

(65) Prior Publication Data
US 2009/0239447 A1    Sep. 24, 2009

(30) Foreign Application Priority Data
Mar. 19, 2008    (JP) ................... 2008-071681

(51) Int. Cl.
*B24B 49/00* (2012.01)
(52) U.S. Cl. ............... 451/5; 451/9; 451/10; 451/26
(58) Field of Classification Search ............. 451/5, 9, 451/10, 26, 62, 249, 251, 460
See application file for complete search history.

(56) References Cited

U.S. PATENT DOCUMENTS

| | | | | |
|---|---|---|---|---|
| 3,964,210 A * | 6/1976 | Moritomo | ........................ | 451/25 |
| 4,061,952 A * | 12/1977 | Dinsdale et al. | ............... | 318/572 |
| 4,373,301 A * | 2/1983 | Parnum et al. | ..................... | 451/5 |
| 4,621,463 A * | 11/1986 | Komatsu et al. | ................. | 451/62 |
| 4,747,236 A * | 5/1988 | Wedeniwski | .................... | 451/11 |
| 4,885,874 A * | 12/1989 | Wedeniwski | .................... | 451/5 |
| 5,251,405 A * | 10/1993 | Clauss et al. | ........................ | 451/9 |
| 5,289,660 A * | 3/1994 | Terasaki et al. | ................. | 451/49 |
| 5,371,975 A * | 12/1994 | Lundmark | ........................ | 451/9 |
| 5,616,070 A * | 4/1997 | Rice et al. | ........................ | 451/62 |
| 5,746,643 A * | 5/1998 | Terasaki et al. | ................. | 451/5 |
| 6,411,861 B1 * | 6/2002 | Clewes et al. | ................. | 700/164 |
| 6,711,829 B2 * | 3/2004 | Sano et al. | ........................ | 33/549 |
| 2007/0054598 A1 * | 3/2007 | Uchida et al. | .................... | 451/5 |
| 2008/0188161 A1 * | 8/2008 | Bremer et al. | .................... | 451/5 |

FOREIGN PATENT DOCUMENTS

JP    5-138422    6/1993

* cited by examiner

*Primary Examiner* — George Nguyen
(74) *Attorney, Agent, or Firm* — Oblon, Spivak, McClelland, Maier & Neustadt, L.L.P.

(57) ABSTRACT

In a non-circular workpiece grinding machine, a proximity sensor is arranged to face a non-circular portion of a workpiece for sensing a maximum diameter portion of the non-circular portion to detect that the maximum diameter portion is rotating in a detection phase section when the work spindle is rotating in a low speed rotational phase region in which the work spindle is controlled by a numerical controller to rotate at a low speed. Abnormality judging means is provided for judging that an abnormal workpiece rotation is occurring when the maximum diameter portion of the non-circular portion is not detected by the proximity sensor in the state that the work spindle is rotating in the low speed rotational phase region.

9 Claims, 6 Drawing Sheets

DETECTING DEVICE FOR ABNORMAL WORKPIECE ROTATION IN NON-CIRCULAR WORKPIECE GRINDING MACHINE

INCORPORATION BY REFERENCE

This application is based on and claims priority under 35 U.S.C. 119 with respect to Japanese patent application No. 2008-071681 filed on Mar. 19, 2008, the entire content of which is incorporated herein by reference.

BACKGROUND OF THE INVENTION

1. Field of the Invention

The present invention relates to a device suitable for detecting the abnormal rotation of a workpiece being ground in a non-circular workpiece grinding machine such as cam grinding machine.

2. Discussion of the Related Art

Generally, workpieces having non-circular portions such as cams or the like are ground in numerically controllable grinding apparatuses (i.e., numerical control grinding machines). In such apparatuses, a work spindle for supporting a workpiece is rotatably supported in a work head, and a wheel head rotatably supporting a grinding wheel is movable in a direction intersecting with the work spindle, wherein feed amounts of the wheel head are controlled in a synchronous relation with the rotation of the work spindle. The grinding of each non-circular portion is carried out in the manner of, e.g., varying an override value representing the change rate in the work spindle rotational speed, in dependence on the amount of the non-circular portion ground with the grinding wheel per unit angle rotation of the workpiece or varying the override value for the work spindle rotational speed to make the grinding speed of the non-circular portion constant over the whole circumference thereof.

That is, during a rough grinding, because the grinding resistance built up is smaller at a maximum diameter portion and a base circle portion of each non-circular portion of the workpiece than at other portions, the machining at each of the maximum diameter portion and the base circle portion is performed with the rotational speed of the work spindle increased for a shorter machining time, while the machining at each of other portions than the maximum diameter portion and the base circle portion is performed with the rotational speed of the work spindle decreased because the grinding resistance at each of such other portions is large. That is, there is performed a grinding ability constant control for keeping the grinding amount per unit time constant. Further, during a finish grinding, for enhancement in the machining accuracy, there is performed a so-called grinding speed constant control, wherein the rotational speed of the work spindle is varied in dependence on radii at respective circumferential regions of each non-circular portion so that the grinding speed on each non-circular portion of the workpiece is controlled to be maintained constant.

FIG. 8 shows one example of a known detecting device for detecting abnormal workpiece rotation in the event that a workpiece W with non-circular portions comes not to rotate bodily with a work spindle. In the known device, a proximity switch 200 is provided on a work table 12, mounting thereon a work head (not shown) which supports the workpiece W, to face the circumferential surface of the workpiece W on the side opposite to a grinding wheel G. When a maximum diameter portion (e.g., top portion in the case of a cam) of the workpiece W is not detected by the proximity switch 200, the known device detects that the workpiece W is abnormally rotating relative to the work spindle. Further, as described in JP 5-138422 A, a device for detecting the breakage of a phase pin 3 which serves as a machining phase reference of a workpiece to a work spindle uses a noncontact sensor 4 and detects abnormal workpiece rotation in the event that the workpiece comes not to rotate bodily with the work spindle.

When judging that the maximum diameter portion of the non-circular portion of the workpiece is detected not to be rotating in a synchronous relation with the rotation of the work spindle, these known devices judge the occurrence of an abnormality and discontinue the ongoing machining operation, whereby the non-circular portion being ground of the workpiece or the grinding wheel can be prevented from being damaged.

However, in the aforementioned numerical control grinding machines, the rotational speed of the work spindle being under speed control tends to be increased for higher efficiency. This makes it difficult for the proximity sensor to detect the maximum diameter portion because the rotational speed of the work spindle is high. Therefore, in order to secure a sufficiently wide detection region and hence, a threshold value of a wide range therefor, in other words, in order to secure a sufficient time period (t) for the proximity sensor to detect the maximum diameter portion, it becomes unavoidable to take appropriate measures such as, e.g., by widening the arc of a sensing portion for the proximity sensor which detects the maximum diameter portion of the non-circular portion. This gives rise to a problem that the detection accuracy is deteriorated. This is caused by the configuration that the proximity sensor 200 is provided on the work table 12 mounting the work head, as shown in FIG. 8.

Specifically, in the configuration that the proximity sensor 200 is provided on the side opposite to the grinding wheel G with the workpiece W therebetween, the grinding wheel G is machining a base circle portion on the side opposite to the proximity sensor 200 with the workpiece W therebetween when the proximity sensor 200 is detecting the maximum diameter portion of the non-circular portion. At this time, the work spindle is in a high rotational speed range, so that the proximity sensor 200 is subjected to detecting the maximum diameter portion under the condition of the work spindle rotating at a high speed. Therefore, in order to make the detection by the proximity sensor 200 possible in a high speed rotational range of the work spindle, it is unavoidable to take measures in the course of widening the range of the threshold value which specifies the detection region. However, taking such measures makes it difficult to realize precise detection. Under the foregoing circumstance, there has been desired a device capable of precisely and reliably detecting the abnormal workpiece rotation even under the condition that the rotational speed of the work spindle is varied largely in dependence on the rotational phase of the workpiece while a non-circular portion of the workpiece is being ground.

SUMMARY OF THE INVENTION

It is therefore an object of the present invention to provide an improved device which is capable of precisely detecting abnormal workpiece rotation though the device uses a proximity sensor under the existing grinding condition maintained.

Briefly, according to the present invention, there is provided an improved detecting device for abnormal workpiece rotation in a non-circular workpiece grinding machine having a bed; a work head mounted on the bed and rotatably supporting a work spindle for supporting a workpiece with a non-circular portion thereon to be ground; a coupling member for coupling the workpiece with the work spindle to rotate the workpiece together with the work spindle in a predetermined angular phase relation; a wheel head rotatably carrying a grinding wheel and mounted on the bed to be movable back and forth in a direction intersecting with a rotational axis of the work spindle; and a control device for controlling the rotation of the work spindle and the back and forth movement of the wheel head in a correlation according to profile data defining a finish shape of the non-circular portion and for varying the rotational speed of the work spindle in accordance with a grinding condition. The detecting device comprises a sensor arranged to face a non-circular portion being ground with the grinding wheel for sensing a maximum diameter portion of the non-circular portion to detect that the maximum diameter portion is rotating in a detection phase section when the work spindle is rotating in a low speed rotational phase region in which the control device controls the work spindle to be rotated at a low speed. The detecting device further comprises abnormality judging means for judging that abnormal workpiece rotation is occurring, when the maximum diameter portion of the non-circular portion is not detected by the sensor with the work spindle rotating in the low speed rotational phase region.

With this construction, the sensor is arranged to face the non-circular portion being ground with the grinding wheel and senses the maximum diameter portion of the non-circular portion to detect that the maximum diameter portion is rotating in the detection phase section when the work spindle is rotating in the low speed rotational phase region in which the control device controls the work spindle to rotate at the low speed in accordance with the grinding condition. Therefore, it becomes possible for the sensor to precisely detect the maximum diameter portion of the non-circular portion, so that the abnormal workpiece rotation can be judged reliably.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
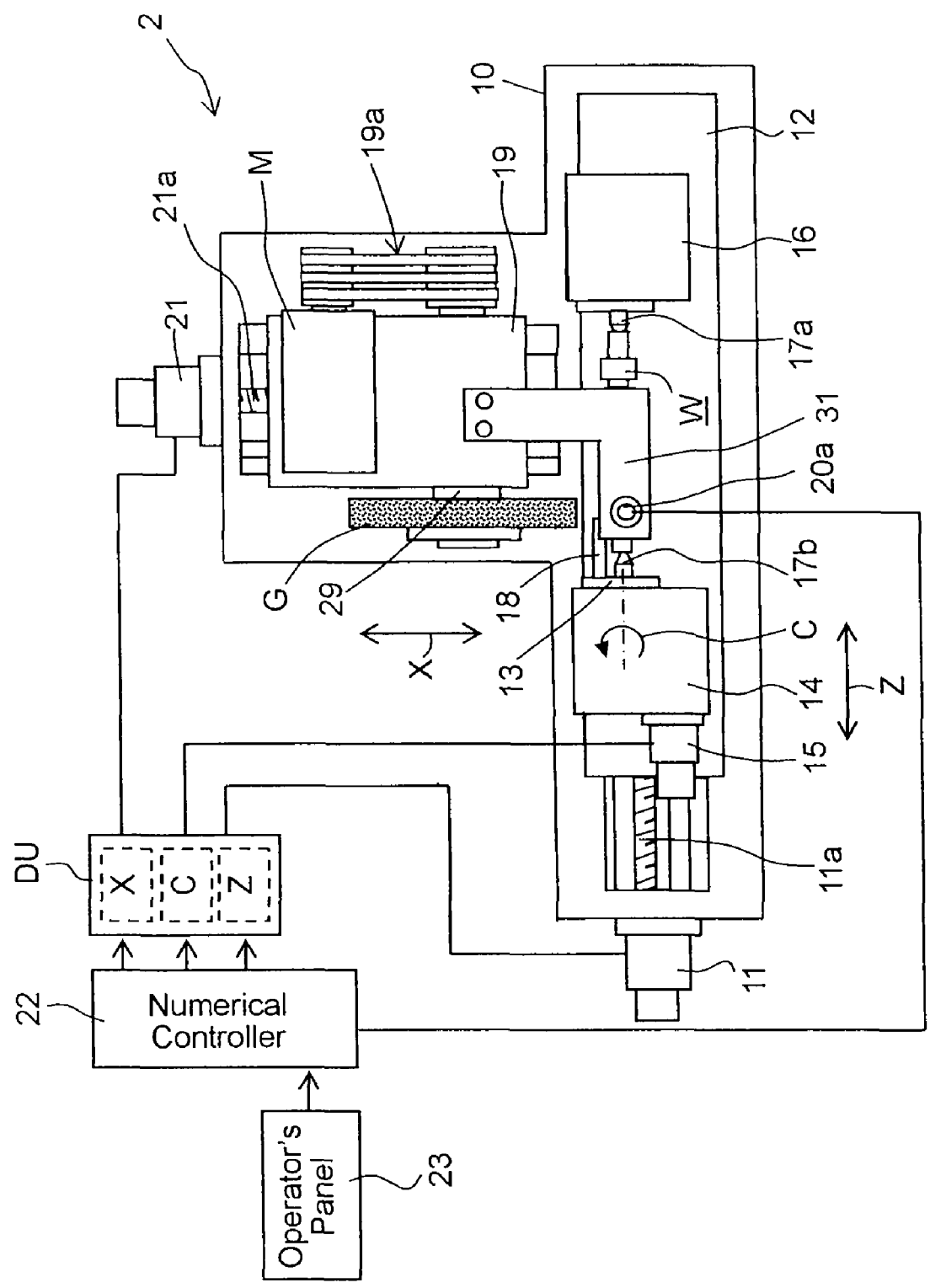
FIG. 1 is a schematic plan view of a numerical control grinding machine incorporating a detecting device for abnormal workpiece rotation in one embodiment according to the present invention.

Hereafter, a non-circular workpiece grinding machine which incorporates a detecting device for abnormal workpiece rotation in one embodiment according to the present invention will be described with reference to the accompanying drawings. Referring now to FIG. 1, a work table 12 which is driven by a servomotor 11 through a feed screw mechanism 11a is mounted on a bed 10 of a numerical control grinding machine 2 slidably in a Z-axis direction parallel to a work spindle axis. A work head 14 rotatably carrying a work spindle 13 therein is mounted on the work table 12, and the work spindle 13 is rotatable about a C-axis as the work spindle axis by a work spindle servomotor 15 mounted on the work head 14. A foot stock 16 is mounted on the right side of the work table 12 as viewed in FIG. 1. A workpiece W with non-circular portions thereon is rotatably supported by a center 17a on the foot stock 16 and a center 17b on the work spindle 13. The workpiece W is for example a camshaft for an automotive engine and has a plurality of cams for intake ports or exhaust ports which correspond in number to the cylinders formed in the automotive engine to which the camshaft is assembled. When loaded into the grinding machine 2, the workpiece W is coupled with the work spindle 13 through a coupling jig or member 18 to determine and hold the rotational phases thereof in a predetermined relation. The coupling member may be attached to the work spindle 13 or the workpiece W to be ground.

A wheel head 19 is mounted on a rear part of the bed 10 and is guided to be movable toward and away from the workpiece W. The wheel head 19 is drivingly connected to a wheel head servomotor 21 through a feed screw mechanism 21a. Thus, it is possible to advance or retract the wheel head 19 in an X-axis direction perpendicular to the Z-axis direction when the servomotor 21 is rotated in a positive or negative-going direction. A wheel spindle 29 driven by an electric motor M through a pulley-belt driving mechanism 19a is rotatably supported by the wheel head 19, and a grinding wheel G is attached to one end of the wheel spindle 29.

Further, in order to control the rotation of the work spindle 13 and the back and forth movement of the wheel head 19, a numerical controller 22 with an operator's panel 23 is connected to the numerical control grinding machine 2 through a drive unit DU for controlling the movements of the respective axes (X-axis, C-axis and Z-axis). The numerical controller 22 is a control device for controlling the rotation of the work spindle 13, the feed amounts of the wheel head 19 and the work table 12 and miscellaneous auxiliary functions in accordance with a machining program (numerical control program) inputted from the operator's panel 23 to grind the workpiece W.

Figure 2:
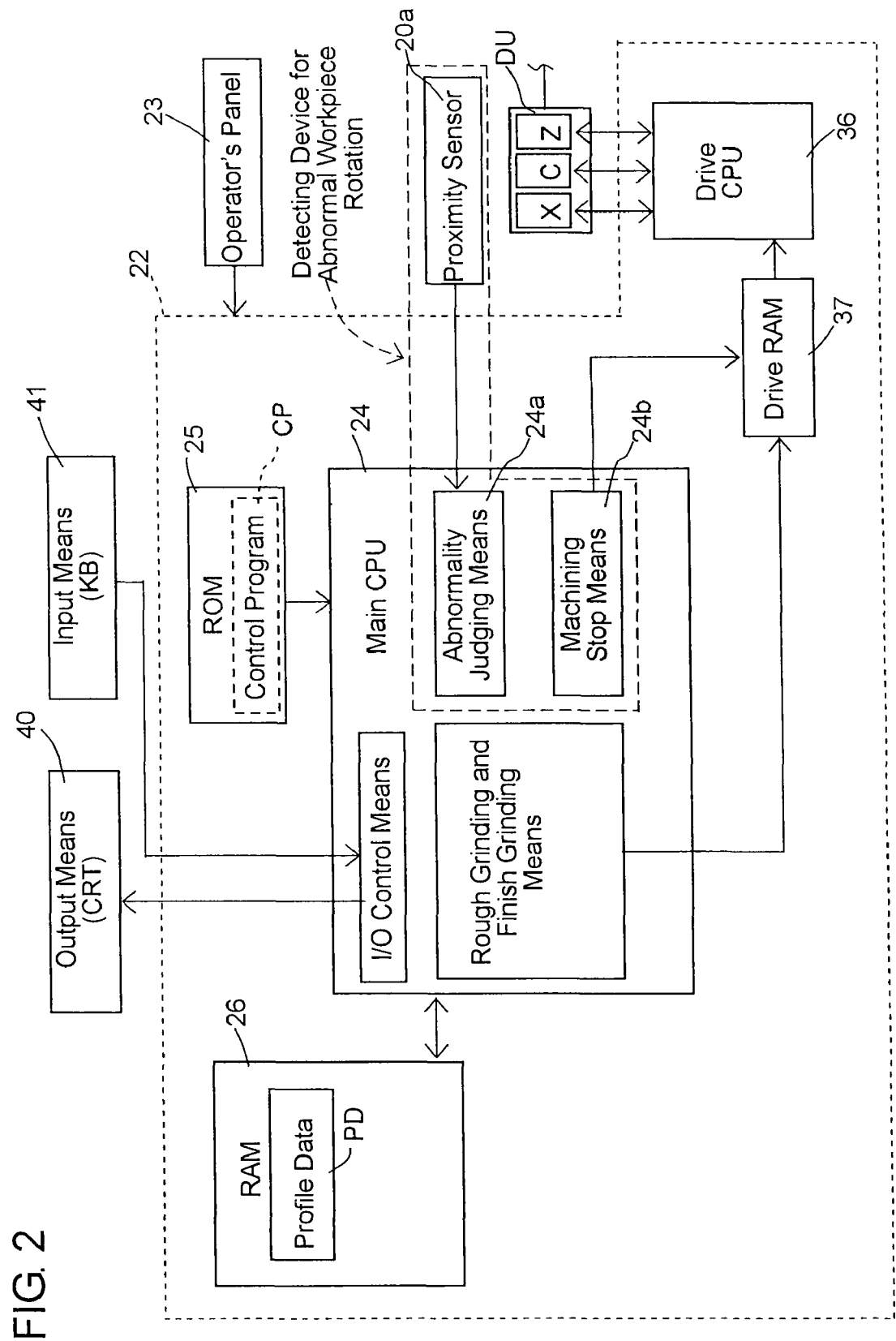
FIG. 2 is a block diagram showing the functional configuration of a numerical controller connected to the numerical control grinding machine.

As shown in FIG. 2, the numerical controller 22 is composed mainly of a main CPU 24 for controlling the rotational motion of the work spindle 13, the feed movements of the work table 12 and the wheel head 19 and the like, a ROM 25 for storing a control program CP and a RAM 26 for temporarily storing inputted data and the like. The RAM 26 stores plural sets of profile data PD for enabling the respective non-circular portions of the workpiece to be machined to respective designated shapes of profile. In accordance with each set of the profile data PD, the wheel head 19 is given a feed amount in the X-axis direction for unit angle rotation of the work spindle 13, and at the same time, a rotational speed VR1 of the work spindle 13 is designated, whereby a profile generating motion is performed through synchronous movements of the work spindle 13 and the wheel head 19. In each set of the profile data PD, infeed amounts for infeeding the grinding wheel G against the workpiece W during the grinding operation have been added to the respective feed amounts of the wheel head 19 for respective rotational angles of the work spindle 13.

In addition, the numerical controller 22 is provided with a drive CPU 36 and a drive RAM 37 for driving the respective servomotors 11, 15 and 21. When position data indicating the respective positions of the wheel head 19, the table 12 and the work spindle 13 is designated from the main CPU 24, the drive RAM 37 stores the designated data information and sends the same to the drive CPU 36. The drive CPU 36 performs arithmetic operations for acceleration, deceleration, interpolation of target points and so on, outputs data for positioning to interpolated points at a fixed frequency, and after pulse distribution calculations, outputs drive command pulses for the respective axes X, C, Z to the drive unit DU.

Figure 5:
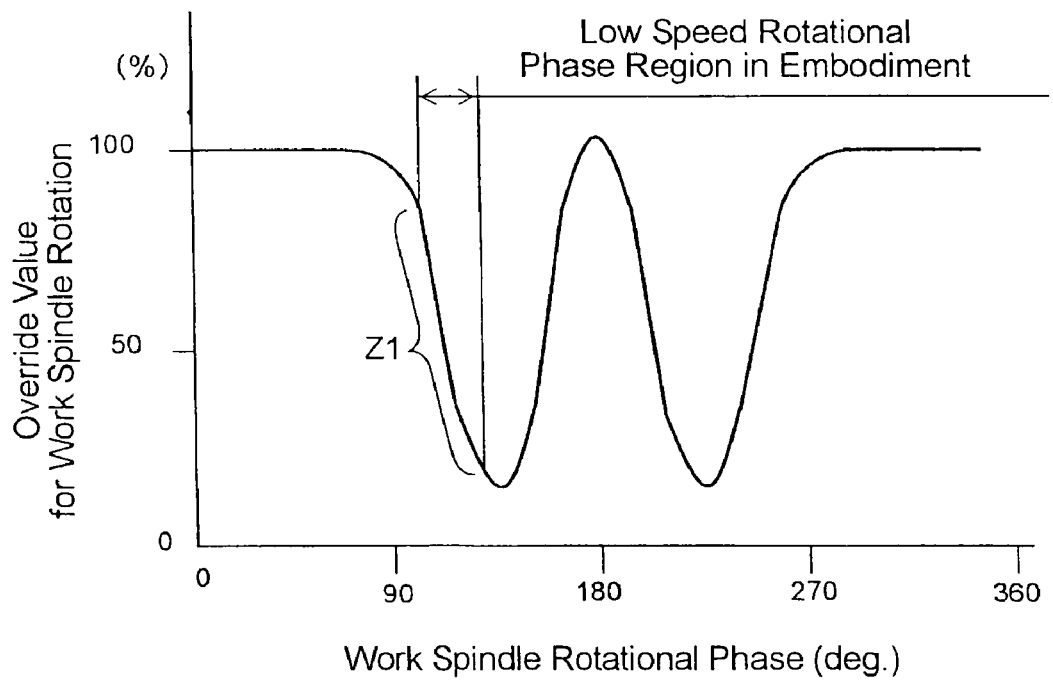
FIG. 5 is graph 1 showing the relation between override value for work spindle rotation and rotational phase of the work spindle in the embodiment.

Next, the detecting device for abnormal workpiece rotation will be described. As shown in FIG. 2, the detecting device for abnormal workpiece rotation is composed of a proximity sensor 20a, abnormality judging means 24a and machining stop means 24b. As the proximity sensor 20a, there is used a proximity switch of noncontact type which utilizes light, magnetic field or the like as sensing medium. The proximity sensor 20a is electrically connected to the numerical controller 22. As shown in FIG. 1, the proximity sensor 20a is secured to the wheel head 19 which is movable back and forth in the X-axis direction, through a bracket 31 attached by means of bolts (not numbered) to the wheel head 19. The proximity sensor 20a is arranged so that while the work spindle 13 is being controlled by the numerical controller 22 to rotate at a low rotational speed in a low speed rotational phase region Z1 shown in FIG. 5, a maximum diameter portion Ct (i.e., a cam top) of the workpiece W being directed upward is rotating in a detection phase section $\theta1$ shown in FIG. 3 to come close and face the proximity sensor 20a. This arrangement enables the proximity sensor 20a to detect that the maximum diameter portion Ct is rotating in the detection phase section $\theta1$.

Figure 3:
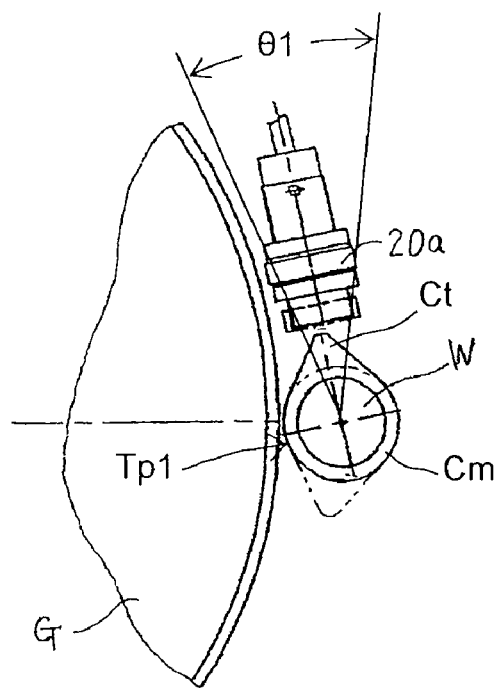
FIG. 3 is a fragmentary side view showing the arrangement of a proximity sensor constituting the detecting device for abnormal workpiece rotation in the embodiment.

More specifically, the detection phase section $\theta1$ is set as the section in which the maximum diameter portion Ct of the non-circular portion Cm travels in a clockwise direction as viewed in FIG. 3 while the non-circular portion or cam Cm is being ground with the grinding wheel G at a transition portion Tp1 which extends from the base circle portion to a cam side portion on the left side as viewed in FIG. 3. That is, when the transition portion Tp1 from the base circle portion to the cam side portion which are behind the maximum diameter portion Ct in the rotational direction (i.e., the clockwise direction as viewed in FIG. 3) is ground with the workpiece W rotating at the low rotational speed, the maximum diameter portion Ct is moves over the detection phase section $\theta1$, so that it becomes possible for the proximity sensor 20a to detect the maximum diameter portion Ct when the workpiece W is rotating at the low rotational speed.

The proximity sensor 20a continues to output an ON-signal while a portion (i.e., the maximum diameter portion Ct) to be detected comes closer to the proximity sensor 20a in a predetermined distance, but continues to output an OFF-signal while the portion is away therefrom beyond the predetermined distance. Where the proximity sensor 20a inputs the OFF-signal to the numerical controller 22 without detecting the maximum diameter portion while the same is rotating in the detection phase section $\theta1$, the abnormality judging means 24a judges the occurrence of abnormal workpiece rotation and sends a signal to the machining stop means 24b, whereby the rotation of the work spindle 13 and the movement of the wheel head 19 are stopped. The length of the detection phase section $\theta1$ is set to the length which enables the proximity sensor 20a to detect the maximum diameter portion Ct of the workpiece W in the state that the work spindle 13 is being rotated at a low speed in the low speed rotational phase region Z1 shown in FIG. 5.

Figure 7:
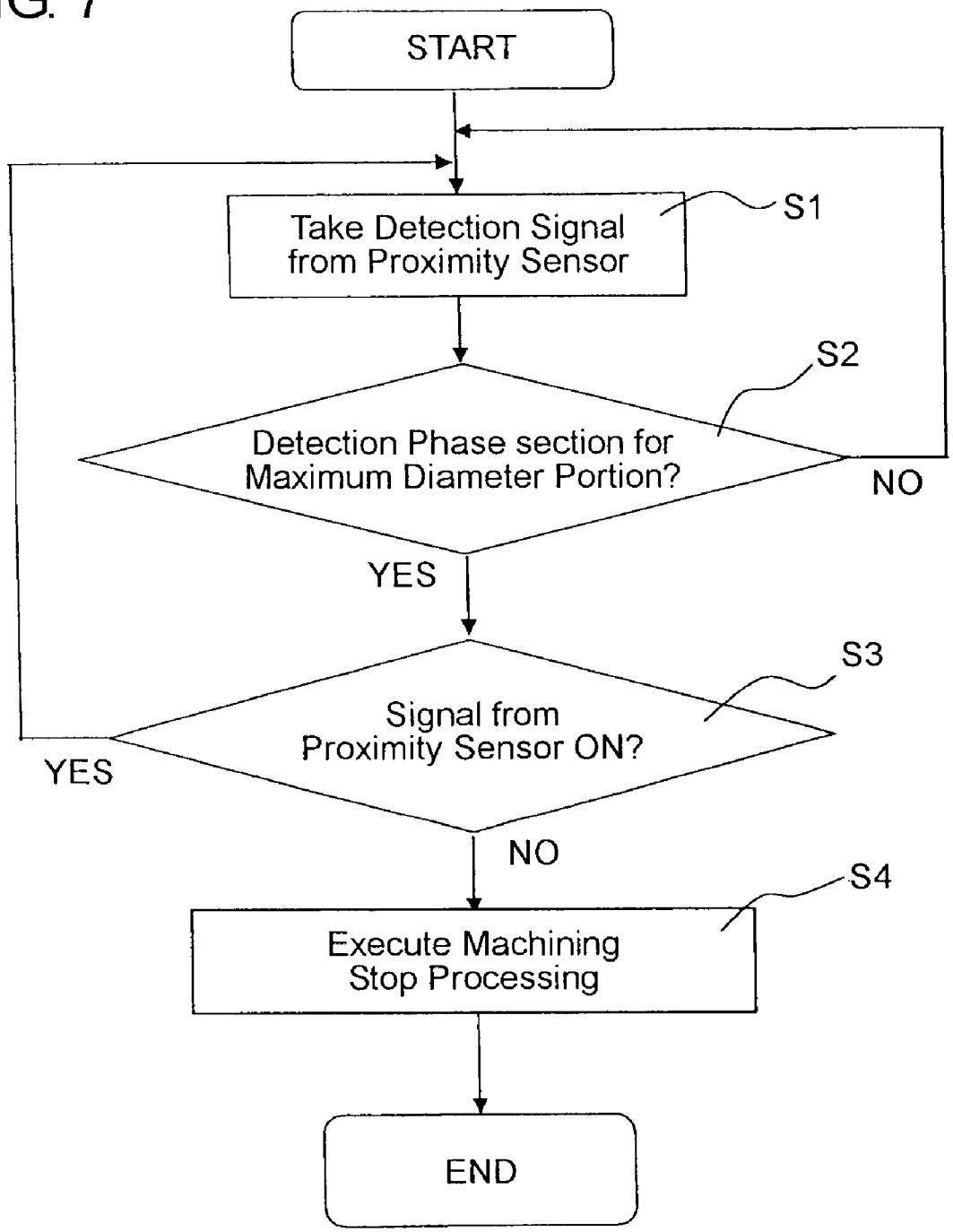
FIG. 7 is a flow chart executed by the numerical controller in detecting abnormal workpiece rotation in the embodiment.
Figure 8:
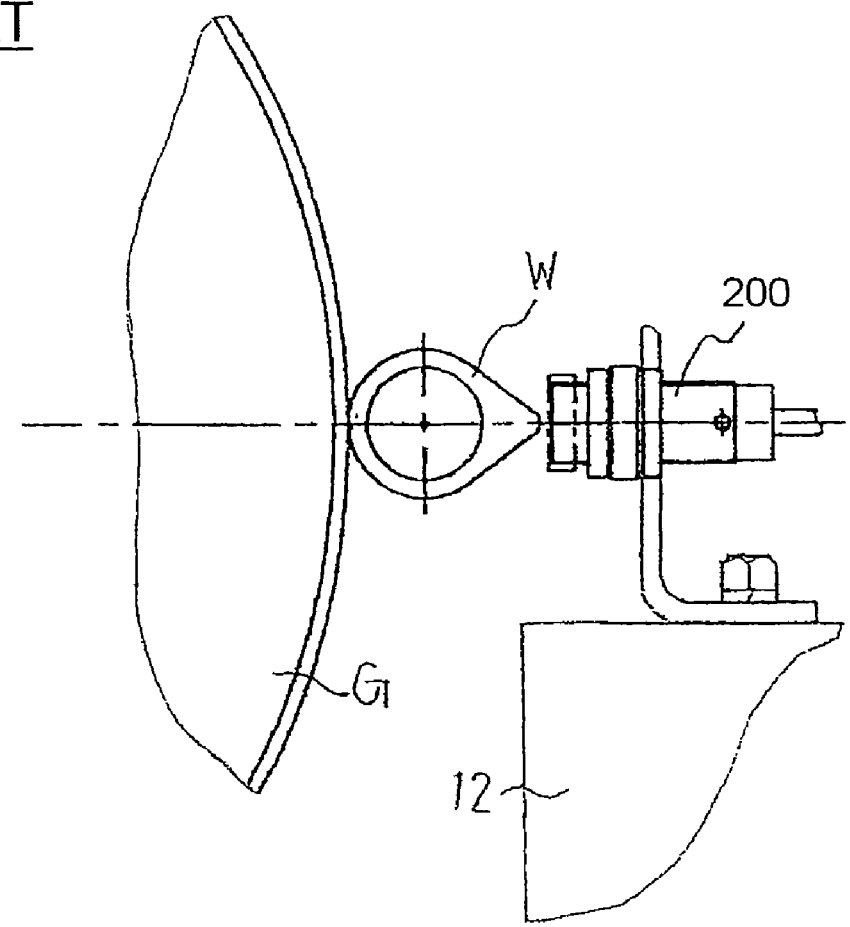
FIG. 8 is a fragmentary side view showing the arrangement of a proximity sensor constituting a detecting device for abnormal workpiece rotation in the prior art.

Next, the operation of the detecting device for abnormal workpiece rotation will be described in accordance with a flow chart shown in FIG. 7 which represents a detection program for abnormal workpiece rotation. First of all, when the numerical control grinding machine 2 is started, the work spindle servomotor 15 is rotated, and the wheel head 19 is advanced and retracted in a correlation or synchronous relation with the rotation of the work spindle 13, whereby a non-circular portion or cam Cm of the workpiece W is ground with the grinding wheel G to a predetermined non-circular shape. During this machining operation, the numerical controller 22 executes the abnormality detection program at fixed time intervals. Thus, the detection signal from the proximity sensor 20a is taken into the numerical controller 22 each time step S1 is reached.

Then, the main CPU 24 serving as the abnormality judging means 24a at this time judges whether or not the work spindle 13 is rotating at a low speed with the maximum diameter portion Ct of the cam Cm traveling in the detection phase section $\theta1$ which is set to correspond to the low speed rotational phase region Z1 in which the transition portion Tp1 from the base circle portion to the cam side portion which are behind the maximum diameter portion Ct in the rotational direction (i.e., the clockwise direction as viewed in FIG. 3) is ground with the workpiece W rotating at the low rotational speed, as mentioned earlier (step S2). When the work spindle 13 is judged to be rotating with the maximum diameter portion Ct of the cam Cm being in the detection phase section $\theta1$, it is judged whether the detection signal inputted from the proximity sensor 20a is ON or not (step S3). If the signal is ON, it is judged that the abnormal workpiece rotation is not occurring, and the machining operation is continued. However, if the detection signal is OFF, it is judged that the abnormal workpiece rotation is occurring, and thus, the numerical controller 22 serving as the machining stop means 24b at this time executes a machining stop processing to discontinue the operations of all of the servomotors 11, 15 and 21 and the like which have been in operation until then.

In the foregoing embodiment, the workpiece W is an automotive engine camshaft on which a plurality of cams for intake ports or exhaust ports are provided at different angular phases in correspondence in number to cylinders of the engine. The proximity sensor 20a is mounted on the wheel head 19 to move together with the wheel head 19. This arrangement enables the proximity sensor 20a to face the circumferential surface of a cam Cm being ground, at a position over the cam Cm at all times. Therefore, when the work spindle 13 is controlled by the numerical controller 22 to be rotated at a low speed as the cam Cm is ground with the grinding wheel G at the transition portion Tp1 from the base circle portion to the cam side portion which are behind the maximum diameter portion Ct in the rotational direction of the workpiece W, it becomes possible to directly and reliably detect whether the maximum diameter portion Ct of the cam Cm being ground is in the detection phase section $\theta1$, so that the judgment of whether the abnormal workpiece rotation is occurring or not can be made precisely.

Modifications of the Embodiment

The foregoing embodiment has been described regarding a non-circular workpiece grinding machine provided with a control device which executes a so-called grinding efficiency constant control wherein the override value for the work spindle rotation can be varied in dependence on the grinding amount of a non-circular portion with the grinding wheel per unit angle rotation of the workpiece. However, without being limited to the grinding machine for such grinding efficiency constant control, the present invention is also applicable to a non-circular workpiece grinding machine which is capable of executing a so-called grinding speed constant control for the purpose mainly of enhancement in machining accuracy. The grinding machine for such grinding speed constant control is provided with a control device which can control the rotational speed of a work spindle to vary in such a way that the grinding speed of the workpiece can be maintained constant by varying the override value for the work spindle rotation in dependence the radius of a region or portion being ground of the workpiece, that is, by decreasing the override value as the radius of the portion being ground increases.

Figure 4:
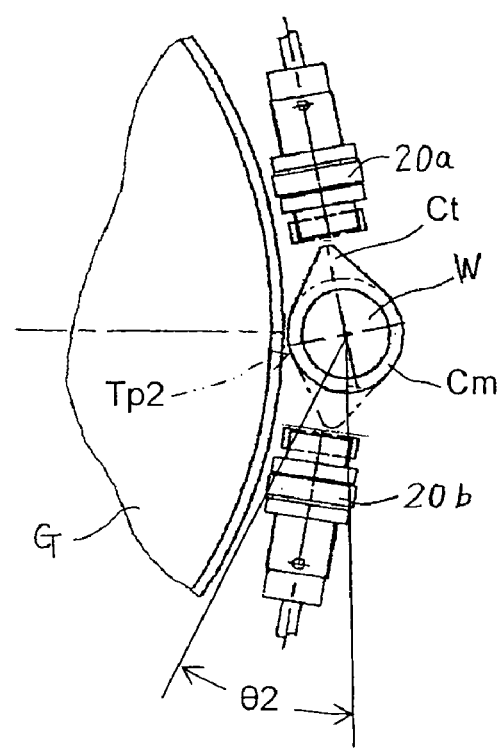
FIG. 4 is a fragmentary side view showing the arrangements of proximity sensors constituting the detecting device for abnormal workpiece rotation in a modified form of the embodiment.
Figure 6:
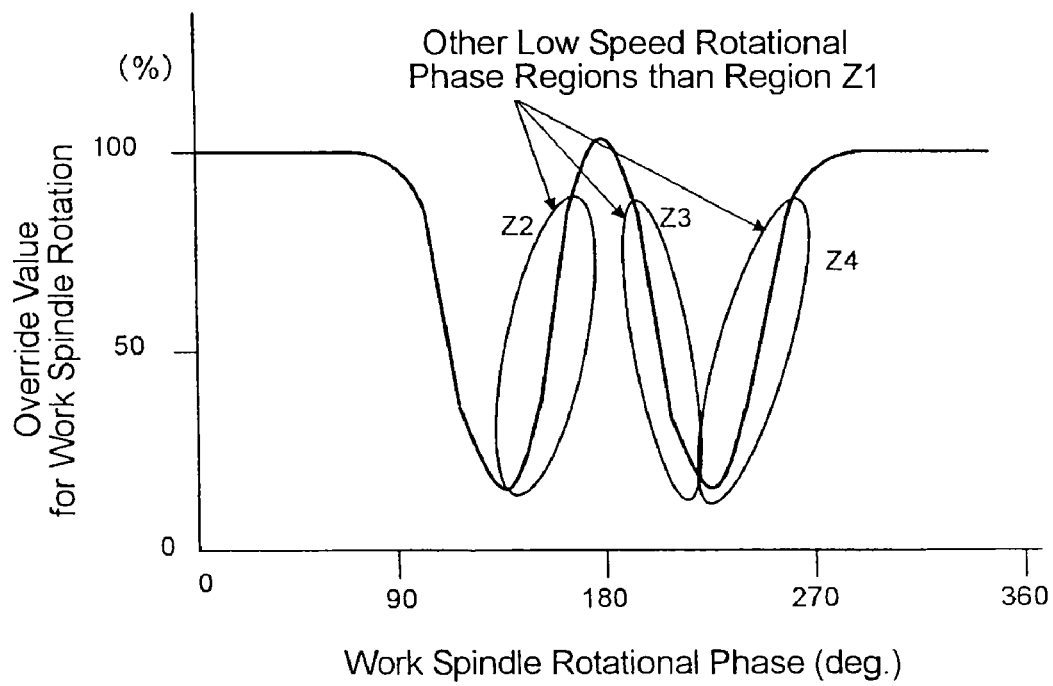
FIG. 6 is graph 2 showing the relation between override value for work spindle rotation and rotational phase of the work spindle in the modified form of the embodiment.

In the foregoing embodiment, as shown in FIG. 3, the proximity sensor 20a is provided over the non-circular portion or cam Cm being ground of the workpiece W. However, low speed rotational phase regions in each of which the work spindle 13 should be controlled by the numerical controller 22 to be rotated at a small override value (i.e., at a low rotational speed) include not only the aforementioned region Z1 shown in FIG. 5 but also other regions as indicated by Z2 to Z4 in FIG. 6. In order to detect that the maximum diameter portion Ct of the non-circular portion Cm being ground is rotating in each of these four regions Z1-Z4, an additional proximity sensor 20b may be provided under the non-circular portion Cm being ground, in addition to the aforementioned proximity sensor 20a provided over the non-circular portion Cm as shown in FIG. 4. Briefly, the additional proximity sensor 20b operates to detect the maximum diameter portion Ct which travels in another detection phase section θ2 set for the additional proximity sensor 20b when the grinding wheel G is grinding another transition portion Tp2 extending from the base portion to the other cam side portion which are ahead of the maximum diameter portion Ct in the rotational direction of the workpiece W (i.e., the clockwise direction as viewed in FIG. 4).

Further, although in the foregoing embodiment, the proximity sensor 20a and the additional proximity sensor 20b are mounted on the wheel head 19 through the bracket 31 to move together with the wheel head 19, they may be provided on a member which is moved in synchronous relation with the movement of the wheel head 19 though not mounted on the wheel head 19. The same effects as those in the foregoing embodiment can be achieved also in this modified form.

Moreover, in a further modified form, the proximity sensors 20a, 20b may be provided on the bed 10 of the grinding machine 2. In this further modified form, the proximity sensors 20a, 20b are secured to the bed 10 through one or more suitable brackets in front of the grinding wheel G and in alignment with the same and are arranged respectively over and under the non-circular portion Cm being ground to face the circumferential surface of the non-circular portion Cm in the same angular arrangements as shown in FIG. 4. In this modified form, it becomes possible to directly detect the maximum diameter portion Ct of the non-circular portion Cm being ground with the grinding wheel G at all times, so that the same effects as those in the foregoing embodiment can be attained.

Moreover, instead of being provided over the non-circular portion or cam Cm being ground with the grinding wheel G, the proximity sensor 20a in the foregoing embodiment shown in FIG. 3 may be provided at the position under the non-circular portion or cam Cm being ground with the grinding wheel G like the additional proximity sensor 20b, that is, at the position occupied by the additional proximity sensor 20b.

Various features and many of the attendant advantages in the foregoing embodiment and the modifications thereof will be summarized as follows:

In the foregoing embodiment typically shown in FIG. 3, the proximity sensor 20a is arranged to face the non-circular portion Cm being ground with the grinding wheel G and senses the maximum diameter portion Ct of the non-circular portion Cm to detect that the maximum diameter portion Ct is rotating in the detection phase section θ1 when the numerical controller 22 capable of varying the rotational speed of the work spindle 13 in accordance with a grinding condition is controlling the work spindle 13 to rotate in a low speed rotational phase region Z1 in which the work spindle 13 is rotated at a low speed. Therefore, it becomes possible for the proximity sensor 20a to precisely detect the maximum diameter portion Ct of the non-circular portion Cm, so that the abnormal workpiece rotation can be judged reliably.

Also in the foregoing embodiment typically shown in FIG. 3, the proximity sensor 20a is arranged to face the non-circular portion Cm being ground with the grinding wheel G. Further, the proximity sensor 20a is arranged to detect that the maximum diameter portion Ct is rotating in the detection phase section θ1 when the work spindle 13 is rotating in the low speed rotational phase region Z1 in which the work spindle 13 is controlled by the numerical controller 22 to rotate at the low speed in dependence on the grinding amount of the non-circular portion Cm with the grinding wheel G per unit angle rotation of the workpiece W. Therefore, it becomes possible for the proximity sensor 20a to precisely detect the maximum diameter portion Ct of the non-circular portion Cm, so that the workpiece abnormal rotation can be judged reliably.

In a modified form of the embodiment, the proximity sensor 20a is arranged to face the non-circular portion Cm being ground with the grinding wheel G. Further, the proximity sensor 20a is arranged to detect that the maximum diameter portion Ct is rotating within the detection phase section θ1 when the work spindle 13 is rotating in the low speed rotational phase region Z1 in which the work spindle 13 is controlled by the numerical controller 22 to make the grinding speed of the non-circular portion Cm constant. Therefore, it becomes possible for the sensor 20a to precisely detect the maximum diameter portion Ct of the non-circular portion Cm, so that the workpiece abnormal rotation can be judged reliably.

Also in the foregoing embodiment typically shown in FIG. 1, the proximity sensor 20a is mounted on the wheel head 19 in position to face the non-circular portion Cm being ground of the workpiece W. Thus, it is possible for the proximity sensor 20a to detect the non-circular portion Cm being ground at all times. Therefore, the proximity sensor 20a can detect that the maximum diameter portion Ct is rotating in the detection phase section θ1 when the work spindle 13 is controlled by the numerical controller 22 to be rotating in the low speed rotational phase region Z1. As a result, it becomes possible for the proximity sensor 20a to detect the maximum diameter portion Ct of the non-circular portion Cm at an accuracy which is small in variation in detection, so that the workpiece abnormal rotation can be judged reliably.

Also in the foregoing embodiment typically shown in FIGS. 1 and 3, the proximity sensor 20a is provided on the wheel head 19 to be over the cam Cm being ground which is a non-circular portion of an automotive engine camshaft W as workpiece so that it faces the cam. Thus, the proximity sensor 20a facing the cam Cm being ground of the camshaft W over the cam Cm can detect that the maximum diameter portion Ct of the cam Cm is rotating in the detection phase section $\theta 1$ when the work spindle 13 is controlled by the numerical controller 22 to be rotating at the low speed in the low speed rotational phase region Z1. Therefore, although the automotive camshaft W has a plurality of cams which are different in phase from one another, the proximity sensor 20a facing the cam Cm being ground at all times can detect that the maximum diameter portion Ct is rotating in the detection phase section $\theta 1$ when the work spindle 13 is controlled by the numerical controller 22 to be rotating at the low speed in the low speed rotational phase region Z1. Therefore, it becomes possible to directly and reliably detect the maximum diameter portion Ct of the cam Cm of the camshaft W being ground, so that the workpiece abnormal rotation can be judged reliably.

In a modified form of the embodiment shown in FIG. 4, two proximity sensors 20a and 20b are arranged respectively over and under the cam Cm being ground of the camshaft W, so that the correct rotation of the camshaft W can be detected when either one of the transition portions Tp1, Tp2 each extending from the base circle to one or the other cam side portion of the cam Cm is being ground with the grinding wheel G, with the work spindle 13 being rotated in one of low speed rotational phase regions Z1 to Z4.

Obviously, numerous modifications and variations of the present invention are possible in light of the above teachings. It is therefore to be understood that within the scope of the appended claims, the present invention may be practiced otherwise than as specifically described herein.

What is claimed is:

1. A detecting device for abnormal workpiece rotation in a non-circular workpiece grinding machine having a bed; a work head mounted on the bed and rotatably supporting a work spindle for supporting a workpiece with a non-circular portion thereon to be ground; a coupling member for coupling the work spindle with the workpiece to rotate the workpiece together with the work spindle in a predetermined angular phase relation; a wheel head rotatably carrying a grinding wheel and mounted on the bed to be movable back and forth in a direction intersecting with a rotational axis of the work spindle; a control device for controlling the rotation of the work spindle and the back and forth movement of the wheel head in a correlation according to profile data defining a finish shape of the non-circular portion and for varying the rotational speed of the work spindle in accordance with a grinding condition; the detecting device comprising:

a sensor arranged to face a non-circular portion being ground with the grinding wheel for sensing a maximum diameter portion of the non-circular portion to detect that the maximum diameter portion is rotating in a detection phase section when the work spindle is rotating in a low speed rotational phase region in which the control device controls the work spindle to rotate at a low speed of the varying rotational speed; and abnormality judging means for judging that abnormal workpiece rotation is occurring, when the maximum diameter portion of the non-circular portion is not detected by the sensor with the work spindle rotating in the low speed rotational phase region.

2. The detecting device as set forth in claim 1, wherein the control device is capable of varying the rotational speed of the work spindle in dependence on a grinding amount of the non-circular portion with the grinding wheel per unit angle rotation of the workpiece.

3. The detecting device as set forth in claim 1, wherein the control device is capable of varying the rotational speed of the work spindle to maintain constant the grinding speed of the non-circular portion of the grinding wheel.

4. The detecting device as set forth in claim 1, wherein the sensor is provided on the wheel head through a bracket.

5. The detecting device as set forth in claim 1, wherein the workpiece is a camshaft for an engine having a plurality of cams as non-circular portions thereon and wherein the sensor is arranged over one of the cams being ground with the grinding wheel to face such one cam.

6. The detecting device as set forth in claim 5, further comprising an additional sensor which is arranged under one of the cams being ground with the grinding wheel to face such one cam, for sensing the maximum diameter portion of the non-circular portion to detect that the maximum diameter portion is rotating in another detection phase section when the work spindle is rotating in another low speed rotational phase region in which the control device controls the work spindle to rotate at a low speed of the varying rotational speed.

7. The detecting device as set forth in claim 6, wherein each of the sensors comprises a proximity sensor which is responsive to the maximum diameter portion of the non-circular portion rotating together with the work spindle, in noncontact with the maximum diameter portion.

8. The detecting device as set forth in claim 1, further comprising grinding stop means for stopping the rotation of the work spindle and the back and forth movement of the wheel head when the abnormality judging means judges that the abnormal workpiece rotation is occurring.

9. The detecting device as set forth in claim 1, wherein the detection phase section is set as the section in which the maximum diameter portion of the non-circular portion travels in a rotational direction of the workpiece while the non-circular portion is being ground with the grinding wheel at a transition portion extending from a base circle portion to a side portion of the non-circular portion on the side being behind or ahead of the maximum diameter portion in the rotational direction of the workpiece.

* * * * *